Feb. 17, 1925.

J. HOFFMAN

COMPRESSION MOLD

Filed Sept. 9, 1920

1,526,788

Inventor:
Joseph Hoffman.
by *Albert G. Duss*
His Attorney.

Patented Feb. 17, 1925.

1,526,788

UNITED STATES PATENT OFFICE.

JOSEPH HOFFMAN, OF SCHENECTADY, NEW YORK, ASSIGNOR TO GENERAL ELECTRIC COMPANY, A CORPORATION OF NEW YORK.

COMPRESSION MOLD.

Application filed September 9, 1920. Serial No. 409,128.

*To all whom it may concern:*

Be it known that I, JOSEPH HOFFMAN, a citizen of the United States, residing at Schenectady, county of Schenectady, State of New York, have invented certain new and useful Improvements in Compression Molds, of which the following is a specification.

The present invention comprises a device for molding plastic materials, as, for example, mixtures of pitchy or asphaltic materials and mineral fillers. Heretofore, plastic materials have been formed or shaped in a mold consisting of a container and a plunger or ram moving in and out of the container. The ram compressed the material within the container, the stroke or distance moved by the ram being fixed and governed by the construction of the machine. As a slight excess of molding material was usually employed, the excess of material was forced into the clearance space between the mold and the ram causing erosion of the mold. It is the object of my present invention to provide a molding device in which erosion of the mold by excess material is avoided.

Figure 1:
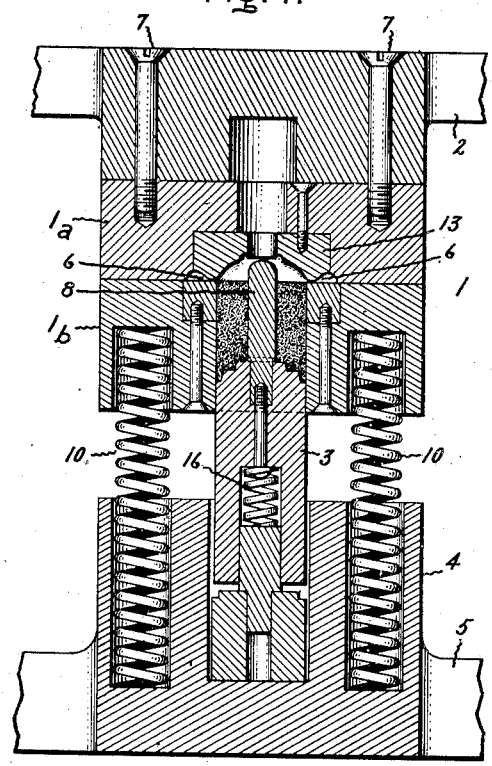
Figure 2:
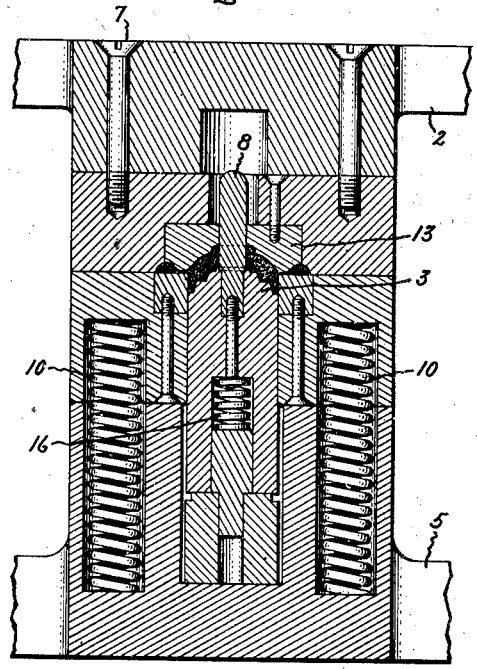
Figure 3:
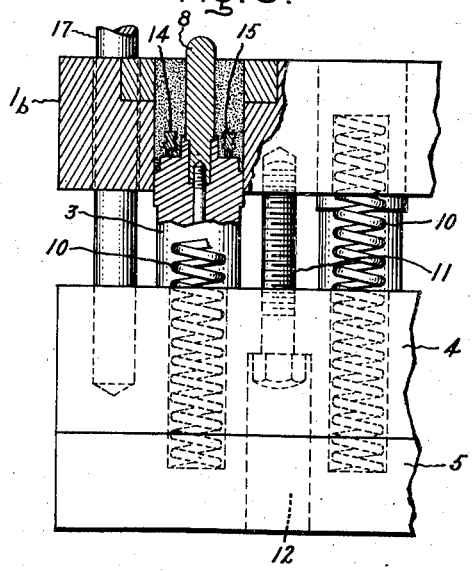

In accordance with one of the features of my invention I have provided a compression mold having provision for the escape of any excess of material to be molded, preferably at a region removed from the bearing surface between the container and the plunger. Other features of my invention are hereinafter described. My invention will be more clearly understood from the following description taken in connection with the accompanying drawings in which Fig. 1 is a vertical section of a mold embodying my invention at the beginning of a molding operation; Fig. 2 illustrates the position of the same parts at the end of a molding operation; Fig. 3 is a vertical section taken at an angle to Fig. 2, and Fig. 4 is a perspective view of a finished molded part produced in the mold illustrating my invention.

The mold illustrated in Figs. 1 and 2 comprises a container 1 carried by a plate 2 of a molding machine. As my present invention is not concerned with the machine as a whole, the plate 2 has been shown broken away from supporting parts of the machine. In a similar manner the plunger 3 is borne on a pedestal 4 which is in turn attached to a plate 5 shown broken away from the molding machine as a whole. The container 1 consists of two members $1^a$ and $1^b$ separating from each other by the action of the machine so that a charge may be placed within the member $b$ as indicated in Fig. 3. The contiguous surfaces of the members $1^a$ and $1^b$ make a close fit with each other at their outer periphery but at the inner periphery they remain separated slightly when pressed into close contact at the outer bearing surface. The constricted peripheral opening communicates with a circumferential cavity 6 into which excess material may be forced, and as shown, remains open during the molding stroke.

Figure 4:
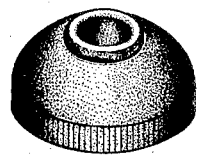

The member $1^a$ conveniently consists of several parts held together by screws 7 and contains an inner cavity into which a pin or prong 8 may extend when molding the particular structure illustrated in Fig. 4, which has a hole in its centre. The ring-shaped member $b$ of the mold is connected to the pedestal 4 by the springs 10 and is limited in displacement with respect to the plunger 3 by bolts 11, one of which is shown in Fig. 3 as moving in a slot 12. As indicated in Fig. 3 a plurality of molds may be carried side by side upon the molding machine. Suitable guides, one of which is shown at 17, Fig. 3, are provided to keep the parts in alignment.

When the member $1^a$ has been moved into suitable relation with the member $1^b$ and cavity in the member $1^b$ is loosely filled with a molding charge as shown in Fig. 1, then the application of pressure results in the compression of the springs 10, thereby forcing the members $a$ and $b$ closely together, and causing the pin 8 to enter the opening in the ring 13 of the member $b$ while compacting the charge as shown in Fig. 2. When pressure is released the plunger is automatically retracted to the position shown in Fig. 1 by the expansion of the springs 10. When the mold member $a$ is moved away from the member $b$ the molded article can be readily withdrawn and the mold is in condition to receive a fresh quantity of charge.

In the case of the attachment plug shown in Fig. 4, it is desired to mold metal eyelets into the body of the plug to which contact fingers may be attached. As shown in Fig. 3, these eyelets 14, 15, conveniently are introduced into the molded mass by the plunger 3. As it is desirable to mold the contact plug under a smoothly increasing pressure and then to press the eyelets 14, 15, home into the molded ring, the plunger 3 is constructed to move for a short distance against a spring 16 housed within the plunger, so that when the springs 10 are almost fully compressed the application of a higher pressure compresses also the spring 16, as shown in Fig. 2, and drives the eyelets 14, 15, into the molded plug.

During the molding stroke any excess of molding mixture squeezes into the circular cavity 6 through the clearance space of say about 0.005 inch between the inner edges of the mold, and in that manner avoiding wear upon the mold walls.

What I claim as new and desire to secure by Letters Patent of the United States, is,—

1. A mold comprising the combination of a container consisting of a plurality of separable parts, one of which is adapted to receive molding material to be compressed, and a plunger movable relatively to said container, said container being provided with an orifice at the surfaces of contact of said mold parts for the escape of excess molding material, said orifice being arranged to remain open during the movement of said plunger.

2. In a molding machine the combination of disengaging members comprising a hollow mold, said members registering in alignment but having abutting surfaces spaced away adjacent the interior edge to leave a cavity communicating through a narrow slit with the interior of said mold, a plunger movable in and out of said mold, means for withdrawing said plunger into one of said members when pressure upon said members is released and means for limiting the displacement of said plunger with respect to said member.

3. A molding machine comprising a container adapted to receive molding charge, a support therefor, a plunger arranged to reciprocate therein to compress said charge, a mold registering with said container to shape said charge when compacted by said plunger, spring-actuated means for drawing said plunger to a predetermined position in said container after a molding stroke has been completed, and means for limiting the displacement of said plunger with respect to said container.

4. A molding device comprising cooperating members one of which has an interior surface configuration desired in the molded article, the other having a bore extending therethrough, a plunger movable through said bore toward the cooperating member by the application of pressure whereby a charge in said bore may be compacted between said three members, means for automatically retracting said plunger upon the release of pressure, means for limiting the retraction of said plunger into said bore.

5. A molding device comprising cooperating mold members, one of which contains a depression the other member having a bore extending therethrough, a plunger movable in said bore, a circumferential opening at the inner edge of the abutting surfaces of said mold members for the escape of excess molding charge, springs positioned to be compressed when said plunger is moved toward the core member having the depression, and means for limiting the retraction of the plunger by said springs when pressure is released.

6. A molding machine comprising a container, a plunger movable in reciprocating relation therein, a support for said plunger, helical springs connecting said container to said support, means limiting the displacement of said plunger with respect to said container in the extended position of said springs, and a mold registering with said container to receive material compressed and ejected from said container by said plunger, and means providing a cavity communicating with said container by a constricted opening to receive excess molding material.

7. A molding machine comprising three main cooperating molding members namely, a hollow charge-receiving member, a plunger reciprocating therein and a separable member having a molding cavity cooperating with said first member, a pedestal support for said plunger, compressible helical springs connecting said charge-receiving member and pedestal, means for limiting the displacement of said plunger, and a compressible spring interposed between said plunger and pedestal, the latter spring being arranged to be compressed during the last portion of the molding stroke.

In witness whereof, I have hereunto set my hand this 8th day of September, 1920.

JOSEPH HOFFMAN.